Jan. 2, 1934.                       P. RUFFINO                        1,942,187
                              FUEL VAPOR AND AIR MIXER
                                 Filed Nov. 15, 1932
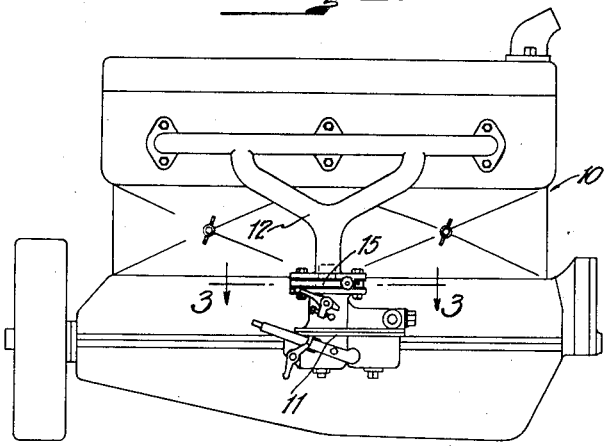
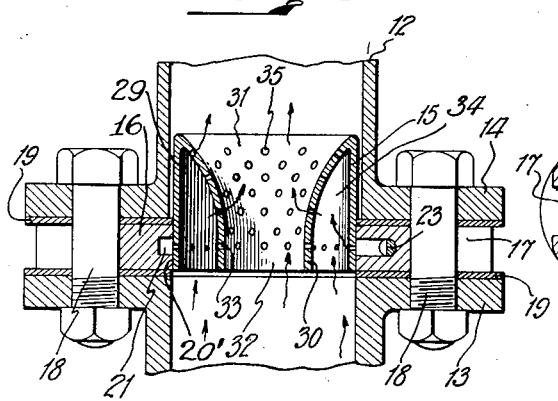   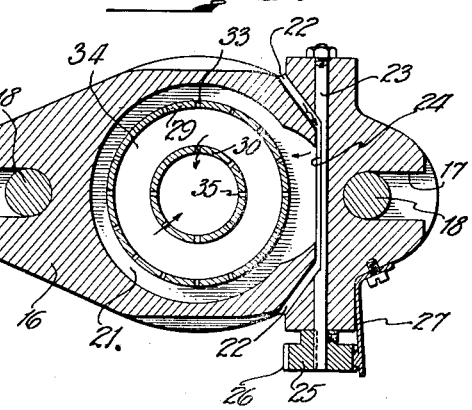
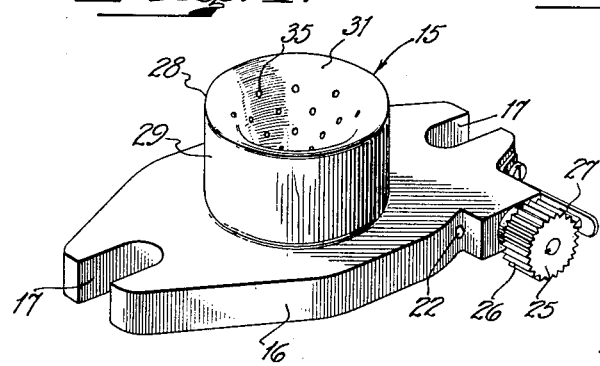   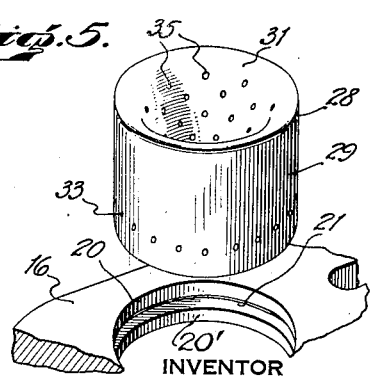
INVENTOR
PETER RUFFINO.
BY
ATTORNEYS Patented Jan. 2, 1934

1,942,187

UNITED STATES PATENT OFFICE 1,942,187

FUEL VAPOR AND AIR MIXER

Peter Ruffino, Brooklyn, N. Y.

Application November 15, 1932
Serial No. 642,726

2 Claims. (Cl. 48—180)

This invention relates to attachments for internal combustion engines and more particularly to an auxiliary air mixing device for the gaseous fuel therefor.

The primary object of the invention resides in a mixing device for introducing atmospheric air into the stream of combustible gas leading from the carburetor to the intake manifold of an internal combustion engine to impart a more rarified condition to the gaseous fuel and to break up the gases of combustion to increase the efficiency of the engine by increasing its power.

Another object of the invention is to provide an air mixing attachment for internal combustion engines which will reduce the amount of carbon accumulation within the cylinders due to the increased efficiency of the gaseous fuel.

A further object is the provision of a fuel gas saving attachment for internal combustion engines which is simple of construction, inexpensive of manufacture, and which may be installed in engines now in use without alterations thereto.

With these and other objects in view, the invention resides in the certain novel construction, combination and arrangement of parts, the essential features of which are hereinafter fully described, are particularly pointed out in the appended claims, and are illustrated in the accompanying drawing, in which:

Figure 1 is a side elevational view of an internal combustion engine with the invention in use.

Figure 2 is an enlarged vertical sectional view of the joint between the carburetor and the intake manifold of an internal combustion engine showing the invention associated therewith.

Figure 3 is an enlarged horizontal sectional view on the line 3—3 of Figure 1.

Figure 4 is a perspective view of the invention per se.

Figure 5 is a fragmentary perspective view of the invention in parts in separated condition.

Referring to the drawing by reference characters, the numeral 10 designates an internal combustion engine of the conventional type which includes a carburetor 11 and an intake manifold 12, the adjacent parts of the carburetor and manifold are provided with flanges 13 and 14 respectively, and it is between these flanges that my invention designated in its entirety as at 15 is fixedly secured.

The invention or device 15 comprises a flat metal base plate 16 of a shape substantially the same as the contour of the flanges 13 and 14 and provided in the plate 16 at diametrically opposite points are slots 17 through which the securing bolts 18 pass. Gaskets 19 are interposed between opposite sides of the plate 16 and the adjacent flanges in order to produce a tight joint between the parts.

The base plate 16 is formed with a circular opening 20 and formed in the annular wall 20' of the opening is a groove or recess 21 which has communication with ducts or air inlets 22. A rotary valve member 23 is mounted in the base plate 16 and is formed with a channel or bore 24 for establishing communication between the air inlets 22 and the recess 21 when the said valve member is turned to an "on" position. One end of the valve member 23 is provided with a manipulating knob 25, the periphery of which is provided with teeth 26 for engagement with a spring actuated dog 27 supported by the plate. The manipulating knob 25 may be manually turned to establish or disestablish communication between the air inlets 22 and the recess 21, or may be moved to a position to regulate the passage of atmospheric air into the recess 21. After an adjustment the spring pressed dog 27 prevents accidental turning of the valve member 23 which might occur due to vibrations caused by the engine when in operation.

Fitting into the opening 20 is a cylindrical body 28 which comprises an outer annular wall 29 and an inner spaced wall 30. The body 28 may be fixedly connected to the base plate 16 in any desirable manner, but in the present instance, the same is shown as welded to the walls of the opening 20 so that the lower end of the body is flush with the bottom of the base plate while the upper end of the same extends above the base plate and within the manifold pipe 12. The upper portion of the inner annular wall 30 is flared outwardly to provide an enlarged mouth portion 31, while the lower portion constitutes a restricted passage 32 which is in axial alinement with the axis of the manifold pipe 12. The outer wall 29 is provided with an annular series of openings 33 which register with the recess 21 so as to establish communication between the recess and the space or chamber 34 defined by the inner outer walls of the body 29. The upper end of the flared wall 30 joins the top of the outer wall 29 as best seen in Figure 2 of the drawing, while the said inner wall is formed with perforations or openings 35.

In operation, assume that gaseous fuel is being drawn from the carburetor 11 into the manifold 12 of the engine. The stream of gaseous fuel must pass upwardly through the restricted passage 32, or enter the chamber or space 34 from where it escapes through the openings 35, and passes on upwardly to the cylinders of the engine. It will be appreciated that the gases which are trapped in the chamber or space 34 will be prolonged in their passage to the cylinders of the engine, and which trapped gases mix with air drawn in through the openings 33 from the recess 21, it being understood that the recess is open to the atmosphere by the turning of the valve member 23 to an "on" or partially on position, the air entering the recess through the air inlet 22. The prolonging of certain of the gases and the mixing of the same with atmospheric air will impart a rarified condition thereto, and when certain of the gases are so mixed with air, they pass on with the other gases of combustion to the cylinders of the engine. The device in addition to feeding auxiliary air to the stream of gaseous fuel also tends to break up the gases of combustion, and consequently improve the combustibility of the same whereupon the efficiency of the engine is increased.

While I have shown and described what I deem to be the most desirable embodiment of my invention, I wish it to be understood that various changes as come within the scope of the appended claims may be resorted to if desired.

Having thus described the invention, what I claim as new and desire to secure by United States Letters Patent, is:—

1. A fuel vapor and air mixer for intake manifolds comprising a plate interposed in the manifold and having a central opening, the walls of said central opening having an annular groove therein, a cylindrical body comprising inner and outer walls, spaced at their lower edges and merging at their upper edges, said inner wall being perforated and said outer wall being snugly fitted in said opening and having an annular row of perforations communicating with said groove, a plurality of air inlets for supplying air to the groove, said plate having a bore providing communication between the groove and the inlets, and a valve comprising an elongated member revolvably mounted in the bore and having an operating knob at one end, said member having a longitudinal channel providing a continuous passage between the inlets and the groove upon a predetermined positioning of the valve.

2. A fuel vapor and air mixer for intake manifolds comprising a plate interposed in the manifold and having a central opening, the walls of said opening having an annular groove therein, a cylindrical body comprising inner and outer walls, spaced at their lower edges and merging at their upper edges, said inner wall being perforated and said outer wall being snugly fitted in said opening and having an annular row of perforations communicating with said groove, a plurality of air inlets supplying air to the groove, and a valve for the inlets comprising a revolvable member operable outwardly of the plate, said member having a longitudinal channel therein to provide a continuous air passage between the inlets and the groove upon a predetermined positioning of the member.

PETER RUFFINO.